United States Patent [19]
Golestani et al.

[11] Patent Number: 6,115,749
[45] Date of Patent: Sep. 5, 2000

[54] SYSTEM AND METHOD FOR USING A WINDOW MECHANISM TO CONTROL MULTICAST DATA CONGESTION

[75] Inventors: Jamal Golestani, Livingston; Krishan K. Sabnani, Westfield, both of N.J.

[73] Assignee: Lucent Technologies Inc., Murray Hill, N.J.

[21] Appl. No.: 08/949,718

[22] Filed: Oct. 14, 1997

[51] Int. Cl.[7] .................................................. G06F 13/00
[52] U.S. Cl. ........................... 709/235; 709/224; 370/229
[58] Field of Search ....................... 395/200.65; 709/235, 709/224; 370/229

[56] References Cited

U.S. PATENT DOCUMENTS

| | | | |
|---|---|---|---|
| 5,179,556 | 1/1993 | Turner | 370/233 |
| 5,519,704 | 5/1996 | Farinacci et al. | 370/402 |
| 5,592,627 | 1/1997 | Burt et al. | 709/232 |
| 5,634,015 | 5/1997 | Chang et al. | 710/129 |
| 5,930,233 | 7/1999 | Kanerva et al. | 370/231 |
| 5,974,028 | 10/1999 | Ramakrishnan | 370/229 |

OTHER PUBLICATIONS

Sanjoy Paul, Krishan K. Sabnani, John C. –H. Lin and Supratik Bhattacharyya, "Reliable Multicast Transport Protocol (RMTP)", IEEE Journal on Selected Areas in Communications, vol. 15, No. 3, Apr. 1997, pp. 407–420.

Christophe Diot, Walid Dabbous and Jon Crowcroft, Multipoint Communication: A Survey of Protocols, Functions, and Mechanisms, IEEE Journal on Selected Areas in Communications, vol. 15, No. 3, Apr. 1997, pp. 277–290.

*Primary Examiner*—Kenneth R. Coulter

[57] ABSTRACT

A system and method for using a window mechanism to control transmission of a multicast in a computer network to curb congestion. In one embodiment, the system includes: (1) a packet monitor that tracks, for each receiver of the multicast, unacknowledged packets transmitted to each receiver and (2) a multicast manager, associated with the packet monitor, that controls transmission of further packets of the multicast to prevent the unacknowledged packets transmitted to any of each receiver from exceeding a maximum number associated with each receiver.

24 Claims, 2 Drawing Sheets

SYSTEM AND METHOD FOR USING A WINDOW MECHANISM TO CONTROL MULTICAST DATA CONGESTION

TECHNICAL FIELD OF THE INVENTION

The present invention is directed, in general, to computer networks and, more specifically, to a system and method for using a window mechanism to control data congestion brought about by a multicast in a computer network.

BACKGROUND OF THE INVENTION

Until recently, communication systems built around the Open Systems Interconnect (OSI) reference model or the Internet architecture were designed to support point-to-point (unicast) services. Presently, one of the most pressing needs for enhanced communication protocols comes from multipoint, or group, applications. The multipoint applications encompass a wide range of applications including software distribution, replicated database update, command and control systems and audio/video conferencing.

A multicast is generally the transmission of data from a single sender to multiple receivers. Multicasting provides an efficient method of disseminating data from a sender to a group of receivers. Instead of sending a separate copy of the data to each individual receiver, the sender sends a single copy to all the receivers. A multicast "tree" is set up in the data communication network with the sender as the "root" node and the receivers as the "leaf" nodes. Data generated by the sender flows through the multicast tree, transversing each tree edge exactly once. For a better understanding of multicasting, see "Multipoint Communication: A Survey of Protocols, Functions, and Mechanisms" by Christophe Diot et al., IEEE Journal on Selected Areas in Communications, Vol. 15, No. 3, April 1997, pp. 277–290, which is herein incorporated by reference.

The reliable distribution of data using the multicast tree in an unreliable network is not guaranteed. Existing protocols [e.g., Internet Protocol(IP), Connectionless Network Protocol (CLNP) and User Datagram Protocol (UDP)] are sufficient for those applications that can be satisfied by a connectionless, relatively unreliable, multicast communication support. A more reliable multicast, however, is required in situations such as in a distributed interactive simulation (DIS) environment or in collaborative applications. Reliable multicast protocols are not new in the area of distributed and satellite broadcast systems. Most of these protocols, however, apply to local area networks and do not scale well in wide area networks.

To address the need for reliable multicast in wide area networks, many transport protocols have been proposed and developed. Most of the focus, however, of the work done in developing reliable multicast schemes and protocols has concentrated primarily on methods for error recovery. For example, one particular transport protocol that has been developed to address the need for more reliable data transmission is the Reliable Multicast Transport Protocol (RMTP). RMTP is designed to provide sequenced, lossless delivery of a data stream, or packets, from one sender to a group of receivers. RMTP is based on a multi-level hierarchical approach in which the receivers are grouped in a hierarchy of local regions. This hierarchical approach allows for the error recovery methodology to be scalable. A designated receiver (DR) in each local region is responsible for sending acknowledgments (ACKs) periodically to the sender, for processing ACKs from the receivers in its region and for retransmitting lost packets to the corresponding receivers. For a more detail understanding of RMTP, see "Reliable Multicast Transport Protocol (RMTP)" by Sanjoy Paul et al., IEEE Journal on Selected Areas in Communications, Vol. 15, No. 3, April 1997, pp. 407–420, which is herein incorporated by reference.

Efforts to develop congestion control methodologies for multicast have been directed primarily in the areas of audio and video multicast transmissions. With voice and audio multicasts, the approach to congestion control has been to receive less data packets, i.e., some of the data packets are not sent to a receiver that decides to ignore them, in order to reduce congestion. While this approach might be satisfactory in the context of voice and audio multicasts, e.g., with video the receiver will still be able to form a coarse or lower resolution picture, for reliable multicast, discarding some data packets is unacceptable.

Accordingly, what is needed in the art are improved methods for controlling congestion that may occur due to a multicast through a computer network. In particular, what is needed in the art is a method for congestion control in reliable multicast transport protocols.

SUMMARY OF THE INVENTION

To address the above-discussed deficiencies of the prior art, the present invention provides a system and method that essentially establishes a multicast "window" to control transmission of a multicast in a computer network to curb congestion. In one embodiment, the system includes: (1) a packet monitor that tracks, for each receiver of the multicast, unacknowledged packets transmitted to each receiver and (2) a multicast manager, associated with the packet monitor, that controls transmission of further packets of the multicast to prevent the unacknowledged packets transmitted to any of each receiver from exceeding a maximum number associated with each receiver.

The present invention therefore introduces the broad concept of managing multicasts by tracking unacknowledged packets for each multicast receiver and allowing only a certain "window" of packets to remain at least partially unacknowledged at a given time. In this manner, multicast transmission of packets is done with separate consideration of the congestion status of the path of each receiver. "Tracks" or "tracking" is defined as "keeping count of" or "monitoring the number of." While each receiver has a maximum number associated therewith, it should be understood that the maximum number may be the same for two or more of the receivers, or may be the same for all receivers, in the simplest case.

In one embodiment of the present invention, the packet monitor establishes a token pool for each receiver, the multicast manager preventing a number of tokens in each the token pool from being outside a particular range.

In one embodiment of the present invention, the token pool for each receiver is initialized with a number of tokens equaling the maximum number associated with each receiver, the packet monitor removing a token from each of the token pools when a packet is transmitted and replacing a token in one of the token pools when a receiver corresponding to the one of the token pools acknowledges receiving the packet. In an alternative embodiment, the token pool for each receiver is initialized to zero, the packet monitor placing a token in each of the token pools when a packet is transmitted and removing a token from one of the token pools when a receiver corresponding to the one of the token pools acknowledges receiving the packet. Thus, the present invention accommodates all particular ways of tracking unacknowledged packets.

In one embodiment of the present invention, the packet monitor and the multicast manager are associated with a sender of the multicast. Alternatively, the packet monitor and multicast manager may be located elsewhere in the computer network. In yet another alternative, packet tracking, or parts of it, is performed by the receivers themselves, perhaps at the receivers' sites.

In one embodiment of the present invention, the multicast manager is capable of dynamically changing the maximum number associated with each receiver. This allows the unacknowledged packet window to adapt to changing network transmission conditions. Alternatively, the maximum number associated with each receiver may be a predetermined, immutable number.

In one embodiment of the present invention, the multicast manager controls retransmission of the unacknowledged packets. In this embodiment, if a given packet remains unacknowledged by at least one receiver past a certain period of time, the packet is retransmitted and acknowledgment of its receipt retracked.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
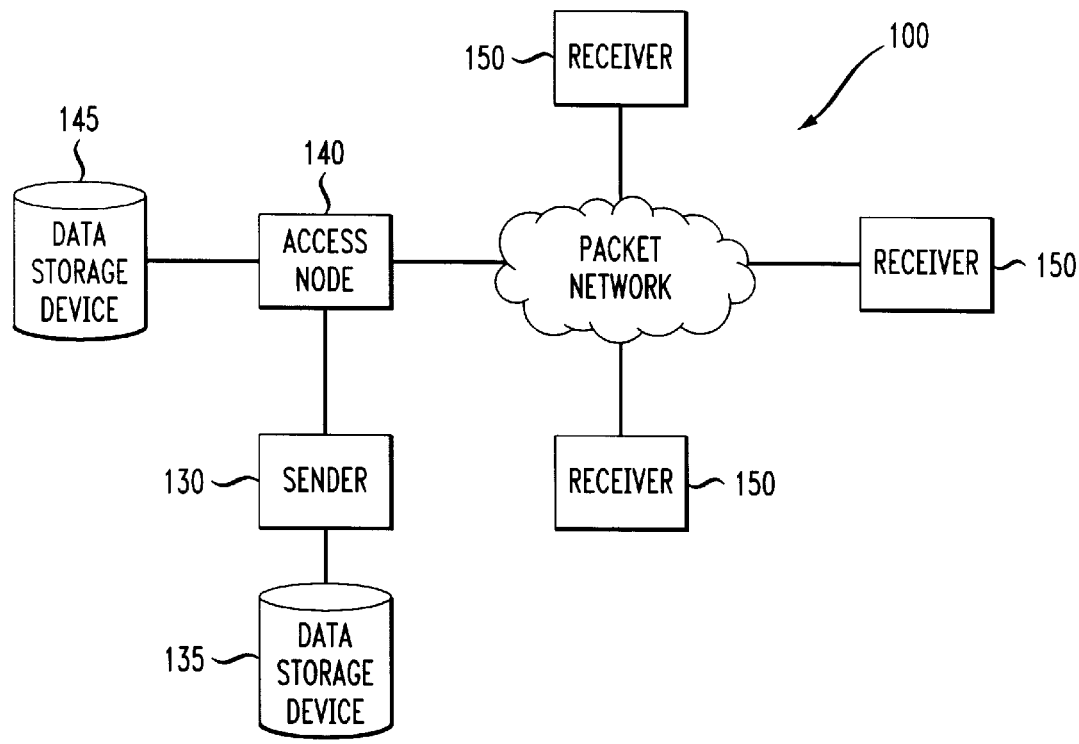
FIG. 1 illustrates an embodiment of a packet network providing a suitable environment for a system constructed according to the principles of the present invention.

Referring initially to FIG. 1, illustrated is an embodiment of a packet network, generally designated 100, providing a suitable environment for a system constructed according to the principles of the present invention. The packet network 100, e.g., the Internet, facilitates the transmission of data in the form of data packets, or datagrams, between a sender and a single receiver, in the case of a unicast, or between a sender and a plurality of receivers, as with a multicast. The packet network 100 includes a sender 130, such as a personal computer (PC), that is coupled to a data storage device 135, e.g., an external hard disk. The system of the present invention is not limited for use with a data storage device such as external physical devices or even the presence of such devices physically connected to the sender 130. The system of the present invention contemplates that the sender 130 is able to access a data storage device at either the sender 130 or at a remote location, or both.

The sender 130 is also coupled to an access node 140 that provides a gateway to the packet network 100. The access node 140 may be a packet network service provider, such as an Internet service provider (ISP), and is shown coupled to a data storage device 145 analogous to the data storage device 135. The presence of the access node 140 is not necessary to the practice of the present invention as the sender 130 is equipped to communicate directly to the packet network 100 without requiring an intermediate interface. A plurality of receivers 150 are also coupled to the packet network 100. The plurality of receivers 150 are typically communication devices, such as PCS.

The sender 130 communicates with the plurality of receivers 150 by sending data packets via the packet network 100. Further information about packet network architectures and transmission of data packets may be found in "Data Network Design," by Darren L. Spohn, McGraw-Hill, Inc. (1993), which is incorporated herein by reference.

Figure 2:
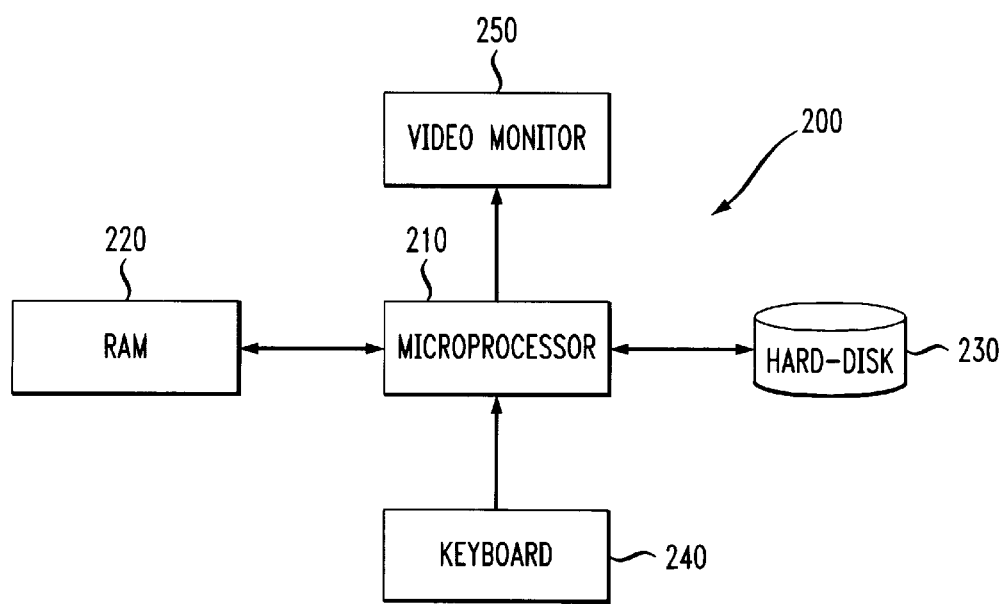
FIG. 2 illustrates a block diagram of an exemplary computer providing an environment within which the system of present invention may be employed and implemented.

Turning now to FIG. 2, illustrated is a block diagram of an exemplary computer, generally designated 200, providing an environment within which the system of present invention may be employed and implemented. The computer 200 includes processing circuitry 210, e.g., having at least one conventional processor, conventional volatile memory 220, e.g., random access memory, and non-volatile memory 230, e.g., a hard disk drive. The processing circuitry 210, volatile memory 220 and non-volatile memory 230 are associated with each other and cooperatively operate to execute the system of the present invention. The computer 200 may further include an input/output device 240, such as a keyboard, and a display device 250, such as a video monitor. The keyboard may be used to control the execution of the process associated with the system of the present invention in the computer 200, and a video monitor may be used to view the results thereof.

The principles of the present invention are not limited to a particular processing environment, but may be implemented in any processing system architecture, including, without limitation, microcomputers, e.g., personal and mainframe computers. Those skilled in the art should readily appreciate that the present invention may be also implemented in hardware. Conventional processing system architecture is discussed in "Computer Organization and Architecture," by William Stallings, MacMillan Publishing Co. (3rd ed. 1993), which is incorporated herein by reference, and conventional processing system network design is discussed in "Data Network Design," by Darren L. Spohn, McGraw-Hill, Inc. (1993).

As mentioned previously, there has been efforts to develop congestion control methodologies for multicast. These efforts, however, have been focused primarily in the areas of video and audio multicast transmissions. Typically, in audio and video muiticasts, it does not matter significantly if the receivers do not receive every data packet that was transmitted by the sender, i.e., some of the transmitted data is lost. The sender and receivers in response to network congestion, will adjust their subscription, i.e., sending or receiving, of data packets. The congestion control methodology employed is a regime of receiving less data packets. For example, upon detection of congestion in the packet network, the sender will adjust the data packets transmission by transmitting only "high priority" packets. The receivers, in turn, instead of receiving all the data packets, will only subscribe to receive the high priority packets. To illustrate, in video multicast, the high priority packets are distinguished from the regular packets in that the receivers will be able to still form a coarse picture, i.e., lower resolution, with the high priority packets.

For reliable unicast communications in packet networks, such as the Internet, a window mechanism method has been widely used as the method for the dual purposes of error and congestion control. The window mechanism controls congestion by keeping the number of outstanding packets, i.e., those packets that have been transmitted but have not been received and those packets that have been received but their acknowledgments have not been received by the source, below a defined maximum number of W, called, for purposes of the present description, a "window size." For unicast communications, this methodology has been successful in preventing congestion in packet networks.

The window mechanism for unicast communications has been often described or implemented using a sliding window embodiment. The sliding window embodiment, which is for example used in a transport control protocol (TCP), is based on an implicit assumption that can present a limitation in its use for congestion control. This assumption is that the acknowledgments of packets are not accepted unless all prior packets that were transmitted earlier in time have been acknowledged. This ordered acknowledgment requirement makes the sliding window embodiment of the window mechanism inconvenient for cases where acknowledgments are also accepted out of order.

The present invention discloses a method for congestion control for multicast communications across a packet network, such as the Internet, using a multicast window mechanism. In order to describe this multicast window mechanism, the use of a token pool embodiment is preferred over a sliding window embodiment in order to easily accommodate out of order acceptance of acknowledgments, where desired. Of course, the same scheme can be described or implemented using other possible embodiments.

In the token pool illustration for a window mechanism, it is assumed that a pool of a certain defined number (W) of tokens, referred to as the window size, is established. Data packets are not permitted to be transmitted unless there is a token in the token pool. The sender removes a token from the pool upon transmitting each new data packet. Upon receiving an acknowledgment from the receiver that the data packet has been received, the sender places the removed token back into the token pool. The sender will also place the removed token back into the token pool, when the sender has not received an acknowledgment and it has concluded that the packet should be considered as lost, e.g., if out of sequence acknowledgment are received or if a time limit has been exceeded. Those skilled in the art should appreciate that the methods for determining if a data packet has been lost are protocol dependent.

Consider the ith receiver in the multicast group and let $W\_i$ be the desired window size in a hypothetical unicast communication between the source and the ith receiver. The average transmission rate from the source to the ith receiver in such a hypothetical unicast communication would have been:

$$R\_i = W\_i / T\_i$$

where $T\_i$ denotes the average round trip time for communication between the source and the ith receiver. The window mechanism for multicast congestion control is now described using a token pool embodiment. Two types of window mechanism for multicast are presented, one of which is actually recommended since it provides superior performance.

In the first type of multicast window mechanism, which is referred to as method A, a single token pool is used with size $W\_min$, i.e., the smallest of the window sizes $W\_i$ of all the receivers. A token from this token pool is consumed each time a packet is transmitted, and whenever the acknowledgment for the transmitted packet is received by the sender from all of the receivers, a token is returned to the token pool. Since the receiver with the longest round trip time, $T\_max$, dominates, the average rate of multicast transmission for method A is approximately:

$$R\_a = W\_min / T\_max$$

In the second type of multicast window mechanism (method B), one token pool is established for each receiver. In this method, a packet may not be sent until a token is available in every pool. When a packet is sent, one token is consumed from each pool. When an acknowledgment for a packet is received from the ith receiver, a token will be returned to the corresponding pool, without waiting for that packet to be acknowledged by the other receivers. It can be shown that the average rate of multicast transmissions for method B is approximately:

$$R\_b = \text{minimum } R\_i = \text{minimum } W\_i / T\_i$$

and assuming minimization is achieved for i=k, it can be concluded that, $$R\_b = W\_k / T\_k = R\_a \cdot (T\_max / T\_k) \cdot (W\_k / W\_min)$$

It should be readily appreciable that method B, i.e., the method of using one token pool for each receiver is the preferred approach. The average rate of transmissions in this method is almost equal to the rate of unicast transmissions to the slowest receiver (receiver k in the above formula), which is larger than the average rate of transmissions in method A by a factor of $(T\_max / T\_k)(W\_k / W\_min)$. This means that if, e.g., the longest round trip time among the receivers is 10 times the round trip time of the slowest receiver, i.e., receiver k, then the average rate of transmission in method B will be at least 10 times more than method A.

For the above reason, we have disclosed method B as the preferred multicast window mechanism. The essence of this preferred multicast window mechanism is that it separately controls the number of outstanding packets for each receiver i and keeps it below the corresponding window size $W\_i$. By outstanding packets of a receiver i, what is meant is the number of packets sent by the sender, for which the sender is still waiting to receive an acknowledgment from receiver i.

Keeping the number of outstanding packets for each receiver i in the multicast group below the corresponding window size $W\_i$ is the essence of this invention. Those skilled in the art should readily appreciate that the particular token pool embodiment just described above may be substituted by other schemes. These other schemes, which may or may not involve token pools but would accomplish the same objective, i.e., would keep the number of outstanding packets for each receiver i in the multicast group below the corresponding window size $W\_i$, are within the broad scope of the present invention.

Figure 3:
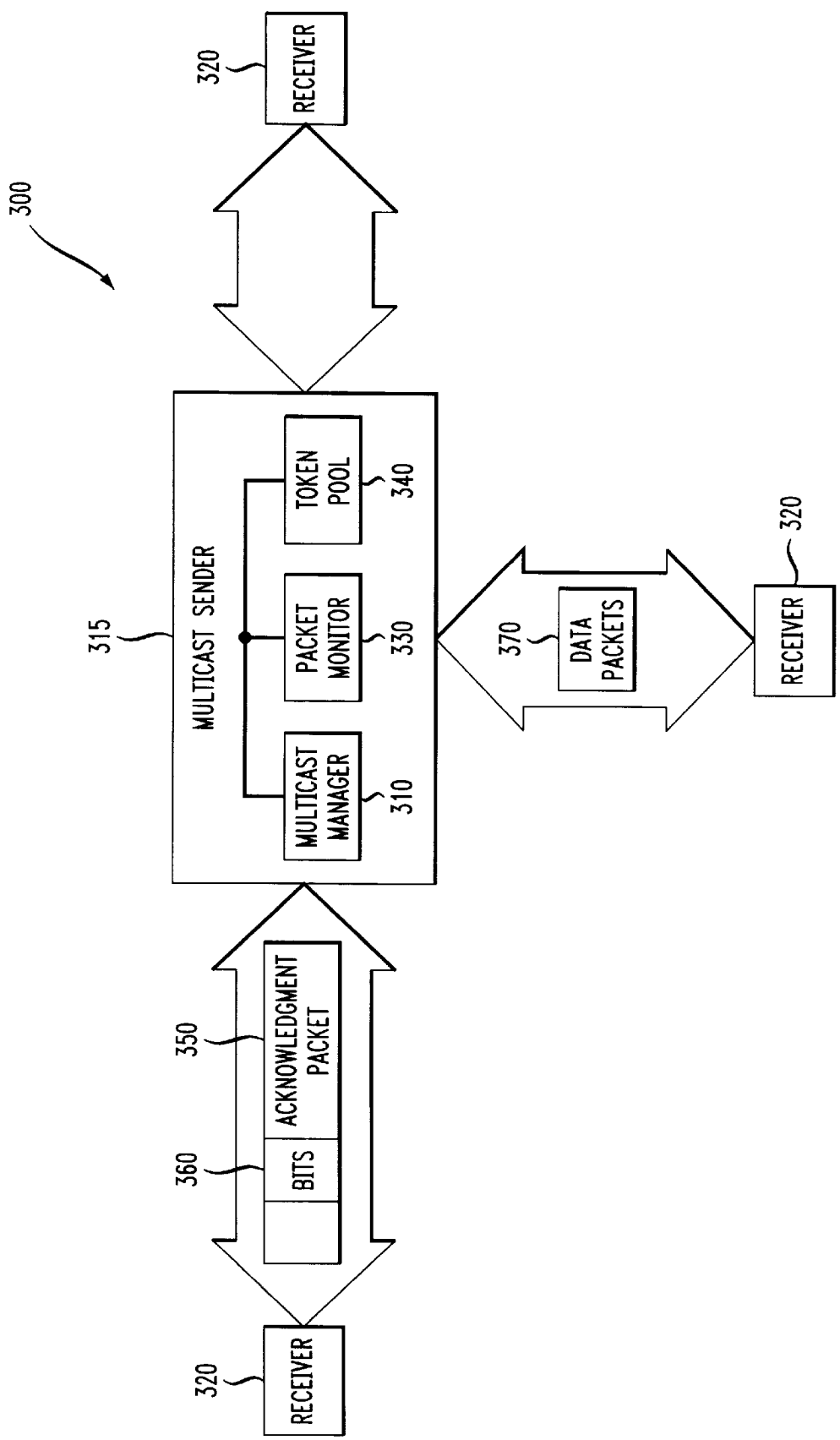
FIG. 3 illustrates a block diagram of an embodiment of a system constructed according to the principles of the present invention.

Turning now to FIG. 3, illustrated is a block diagram of an embodiment of a system constructed according to the principles of the present invention. The system controls congestion due to a multicast in a computer network 300. The system includes a multicast manager 310, associated with a multicast sender 315, that receives from a receiver (one of which is designated 320) an acknowledgment packet (one of which is shown and designated 350) containing a delivery status of individual data packets (one of which is shown and designated 370) of a multicast delivered to the receiver 320. The sender 315 also includes a number of token pools (one of which is shown and referenced 340) one for each of the receivers 320 to which the multicast is transmitted. The system also includes a packet monitor 330, associated with the sender 315, that analyzes the delivery status and modifies the number of tokens in the token pools 340 associated with each of the receivers 320. While the multicast manager 310 and packet monitor 330 are only illustrated in the sender 315 in the present embodiment, there are possible embodiments where these functionalities or their equivalents may be executed at the receivers 320 or at other points of the network.

The size of the token pool 340 associated with the ith receiver 320, $W\_i$, determines the maximum number of data packets 370 that may be outstanding to the ith receiver 320 at any point of time, i.e., the maximum number of data packets 370 that may be transmitted by the sender 315 while it still awaits their acknowledgments 350. The multicast manager 310 controls the transmission of new data packets 370 to prevent the number of data packets 370 that may be outstanding to the ith receiver 320 from exceeding $W\_i$. The sender 315 may not transmit any new data packets 370 to any particular receiver 320 unless there is a token available in every token pool 340. When the sender 315 transmits a new data packet 370, the packet monitor 330 removes a token from all of the token pool 340. Once an acknowledgment for a given data packet 370 is returned from the ith receiver 320, the packet monitor 330 returns one token to the corresponding token pool 340 associated with the ith receiver 320. Those skilled in the art should appreciate that alternative methods to adjust the size of the token pool 340, such as adding tokens to the token pool 340 when data packets 370 are transmitted and removing tokens when acknowledgments are received, may also be implemented. Also, the acknowledgment packet 350 typically contains a bit (having a state that is a function of the delivery status) 360 corresponding to each of the individual data packets 370. Those skilled in the art should understand that an acknowledgment packet 350 does not necessarily have to acknowledge a single data packet 370. As an alternative, an acknowledgment packet 350 may be used to report the delivery status of a number of data packets 370, in which case it may include one status bit per packet 370. It may be required that a receiver 320 sends an acknowledgment packet 350 after each data packet 370 is received, or alternatively, acknowledgment packets may be sent less frequency.

Following the reception of the acknowledgment packets 350, the sender 315 measures the round trip time of each data packet 370. A received acknowledgment packet 350 may contain acknowledgments for more than one data packet 370. The sender 315 then proceeds to update both the round trip time estimate and the time-out for the corresponding receiver 320. The time-out is a time counter that is initialized when a data packet 370 is transmitted and is subsequently decreased until an acknowledgment packet 350 for that data packet 370 is received. Those skilled in the art are aware that time-out counters may be implemented whereby the time measurement is increased. The time-out value is at least the round trip time estimate for the corresponding receiver 320.

A data packet 370 may be considered lost if an acknowledgment packet 350 is not received by the sender 315 at the expiration of the time-out for that receiver 320. Also, a data packet 370 may be considered lost, even before the time out, if the acknowledgment packet 350 of another data packet 370, that was transmitted after the data packet 370 under consideration, has been received by the sender 315. The data packet 370 loss is then registered by the sender 315 and the packet monitor 330 returns a token to the token pool of that particular receiver 320.

As previously mentioned, the sender 315 or receivers 320 are generally general purpose computers, as illustrated in FIG. 2. The general purpose computer is capable of storing and executing a sequence of instructions to operate the system for controlling congestion due to a multicast in a computer network. The multicast manager 310 and packet monitor 330, for instance, are embodied in a sequence of instructions executable on the processor of the general purpose computer. Alternatively, the present invention may be embodied in dedicated or hardwired discrete or integrated circuitry.

In the above description of the window mechanism, it is assumed that the window size $W\_i$ associated with each receiver has a fixed value. Alternatively, it is also possible to adjust the window size $W\_i$ of each receiver based on variations in the network traffic load in accordance with some algorithm. The window mechanism, however, will still continue to operate in the fashion disclosed by the present invention and its operation is independent of whether the window size $W\_i$ is changed or kept constant.

From the above, it is apparent that the present invention provides a system and method for using a window mechanism to control transmission of a multicast in a computer network in order to curb congestion. The system includes: (1) a packet monitor that tracks, for each receiver of the multicast, unacknowledged packets transmitted to each receiver and (2) a multicast manager, associated with the packet monitor, that controls transmission of further packets of the multicast to prevent the unacknowledged packets transmitted to any of each receiver from exceeding a maximum number.

Although the present invention has been described in detail, those skilled in the art should understand that they can make various changes, substitutions and alterations herein without departing from the spirit and scope of the invention in its broadest form.

What is claimed is:

1. A system for controlling transmission of packets of a multicast in a computer network, comprising:

a packet monitor that establishes a token pool for each receiver of said multicast, said token pool initialized with a number of tokens equaling a maximum number associated with said each receiver, said packet monitor removing a token from each of said token pools when a packet is transmitted and replacing a token in one of said token pools when a receiver corresponding to said one of said token pools acknowledges receiving said packet, said packet monitor thereby tracking unacknowledged packets transmitted to said each receiver; and a multicast manager, associated with said packet monitor, that controls transmission of further packets of said multicast based on a number of said tokens in said each of said token pools to prevent said unacknowledged packets transmitted to any of said each receiver from exceeding said maximum number associated with said each receiver.

2. The system as recited in claim 1 wherein said packet monitor and said multicast manager are associated with a sender of said multicast.

3. The system as recited in claim 1 wherein said multicast manager is capable of dynamically changing said maximum number associated with said each receiver.

4. The system as recited in claim 1 wherein said multicast manager controls retransmission of said unacknowledged packets.

5. A method of controlling transmission of a multicast in a computer network, comprising:

tracking, for each receiver of said multicast, unacknowledged packets transmitted to said each receiver, by:
establishing a token pool for said each receiver,
initializing said token pool with a number of tokens equaling a maximum number associated with said each receiver,
removing a token from each of said token pools when a packet is transmitted, and
replacing a token in one of said token pools when a receiver corresponding to said one of said token pools acknowledges receiving said packet; and controlling transmission of further packets of said multicast based on a number of said tokens in said each of said token pools to prevent said unacknowledged packets transmitted to any of said each receiver from exceeding said maximum number associated with said each receiver.

6. The method as recited in claim 5 wherein said tracking and controlling are carried out in a sender of said multicast.

7. The method as recited in claim 5 further comprising dynamically changing said maximum number associated with said each receiver.

8. The method as recited in claim 5 further comprising controlling retransmission of said unacknowledged packets.

9. A computer network, comprising:

a multicast sender;

a plurality of receivers that receive a multicast from said multicast sender; and a system for controlling transmission of said multicast, including:
a packet monitor that establishes a token pool for each of said plurality of receivers, said token pool initialized with a number of tokens equaling a maximum number associated with said each of said plurality of receivers, said packet monitor removing a token from each of said token pools when a packet is transmitted and replacing a token in one of said token pools when one of said plurality of receivers corresponding to said one of said token pools acknowledges receiving said packet, said packet monitor thereby tracking unacknowledged packets transmitted to said each of said plurality of receivers, and
a multicast manager, associated with said packet monitor, that controls transmission of further packets of said multicast based on a number of said tokens in said each of said token pools to prevent said unacknowledged packets transmitted to any of said plurality of receivers from exceeding said maximum number associated with said each receiver.

10. The network as recited in claim 9 wherein said packet monitor and said multicast manager are associated with said multicast sender.

11. The network as recited in claim 9 wherein said multicast manager is capable of dynamically changing said maximum number associated with said each receiver.

12. The network as recited in claim 9 wherein said multicast manager controls retransmission of said unacknowledged packets.

13. A system for controlling transmission of packets of a multicast in a computer network, comprising:

a packet monitor that establishes a token pool for each receiver of said multicast, said token pool initialized to zero, said packet monitor placing a token in each of said token pools when a packet is transmitted and removing a token from one of said token pools when a receiver corresponding to said one of said token pools acknowledges receiving said packet, said packet monitor thereby tracking unacknowledged packets transmitted to said each receiver; and a multicast manager, associated with said packet monitor, that controls transmission of further packets of said multicast based on a number of said tokens in said each of said token pools to prevent said unacknowledged packets transmitted to any of said each receiver from exceeding a maximum number associated with said each receiver.

14. The system as recited in claim 13 wherein said packet monitor and said multicast manager are associated with a sender of said multicast.

15. The system as recited in claim 13 wherein said multicast manager is capable of dynamically changing said maximum number associated with said each receiver.

16. The system as recited in claim 13 wherein said multicast manager controls retransmission of said unacknowledged packets.

17. A method of controlling transmission of a multicast in a computer network, comprising:

tracking, for each receiver of said multicast, unacknowledged packets transmitted to said each receiver, by:
establishing a token pool for said each receiver,
initializing said token pool to zero,
placing a token in each of said token pools when a packet is transmitted, and
removing a token from one of said token pools when a receiver corresponding to said one of said token pools acknowledges receiving said packet; and controlling transmission of further packets of said multicast based on a number of said tokens in said each of said token pools to prevent said unacknowledged packets transmitted to any of said each receiver from exceeding a maximum number associated with said each receiver.

18. The method as recited in claim 17 wherein said tracking and said controlling are carried out in a sender of said multicast.

19. The method as recited in claim 17 further comprising dynamically changing said maximum number associated with said each receiver.

20. The method as recited in claim 17 further comprising controlling retransmission of said unacknowledged packets.

21. A computer network, comprising:

a multicast sender;

a plurality of receivers that receive a multicast from said multicast sender; and a system for controlling transmission of said multicast, including:
a packet monitor that establishes a token pool for each of said plurality of receivers, said token pool initialized to zero, said packet monitor placing a token in each of said token pools when a packet is transmitted and removing a token from one of said token pools when one of said plurality of receivers corresponding to said one of said token pools acknowledges receiving said packet, said packet monitor thereby tracking unacknowledged packets transmitted to said each of said plurality of receivers, and a multicast manager, associated with said packet monitor, that controls transmission of further packets of said multicast based on a number of said tokens in said each of said token pools to prevent said unacknowledged packets transmitted to any of said plurality of receivers from exceeding a maximum number associated with said each receiver.

22. The network as recited in claim 21 wherein said packet monitor and said multicast manager are associated with said multicast sender.

23. The network as recited in claim 21 wherein said multicast manager is capable of dynamically changing said maximum number associated with said each receiver.

24. The network as recited in claim 21 wherein said multicast manager controls retransmission of said unacknowledged packets.

\* \* \* \* \*